May 10, 1932.  U. FORBIDUSSI  1,858,147
FRUIT CRUSHER
Filed Dec. 5, 1930   3 Sheets-Sheet 1
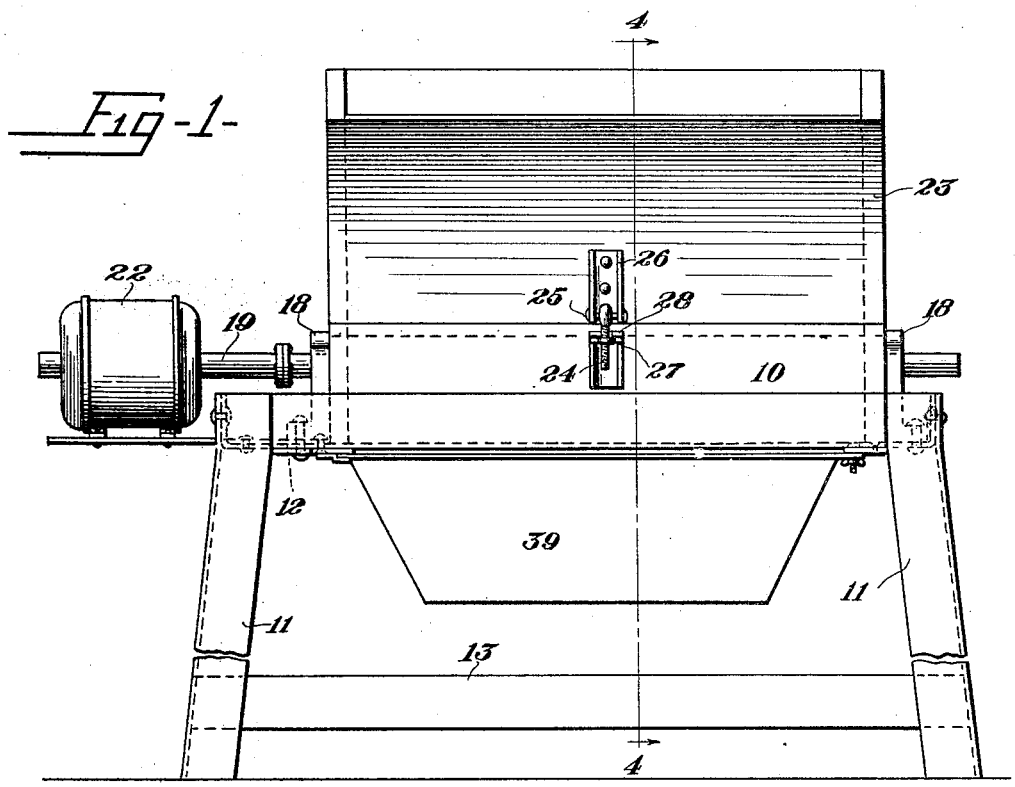
Fig-1-
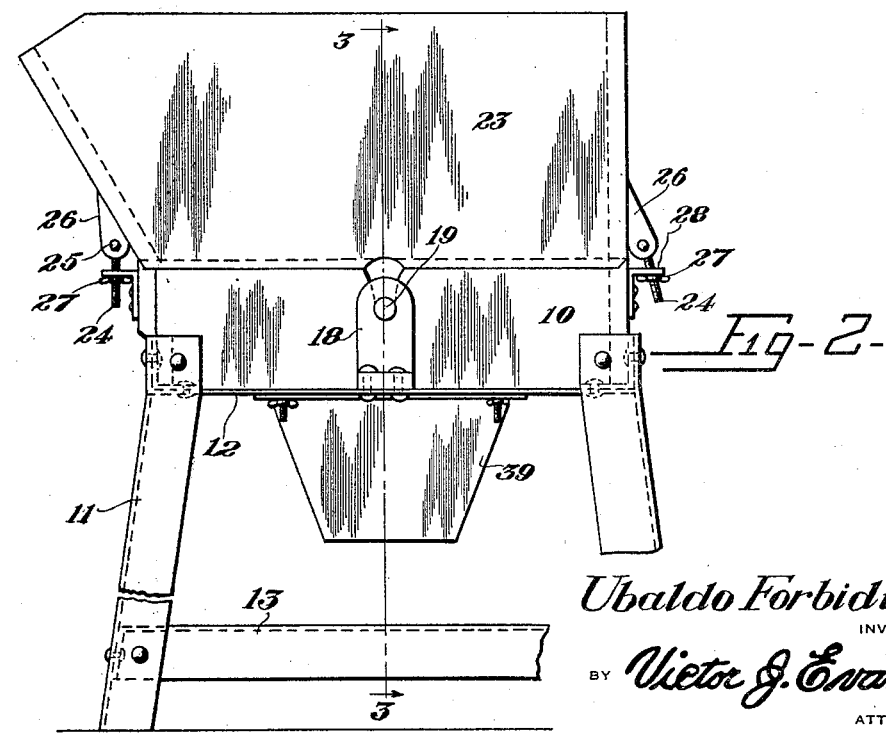
Fig-2-
Ubaldo Forbidussi
INVENTOR
BY Victor J. Evans
ATTORNEY

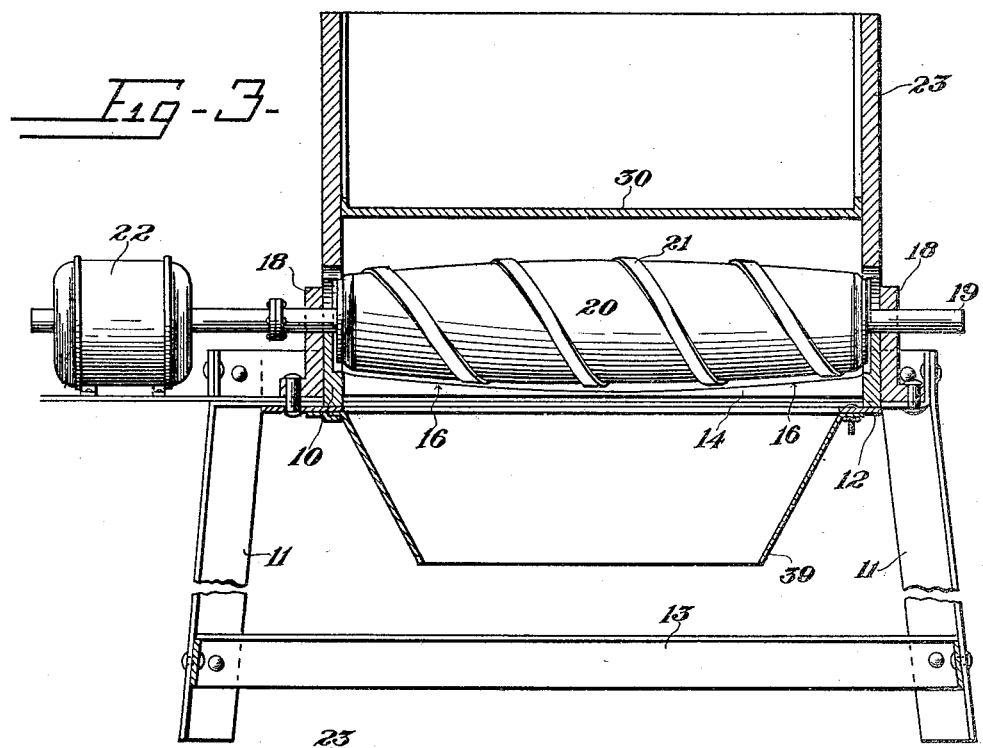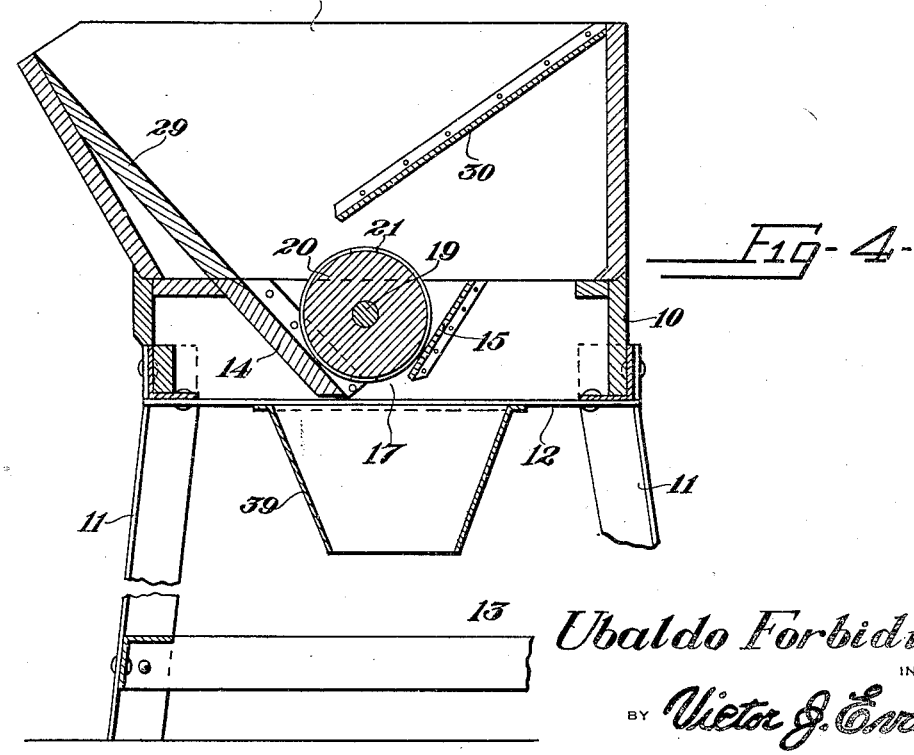

May 10, 1932.  U. FORBIDUSSI  1,858,147
FRUIT CRUSHER
Filed Dec. 5, 1930  3 Sheets-Sheet 3
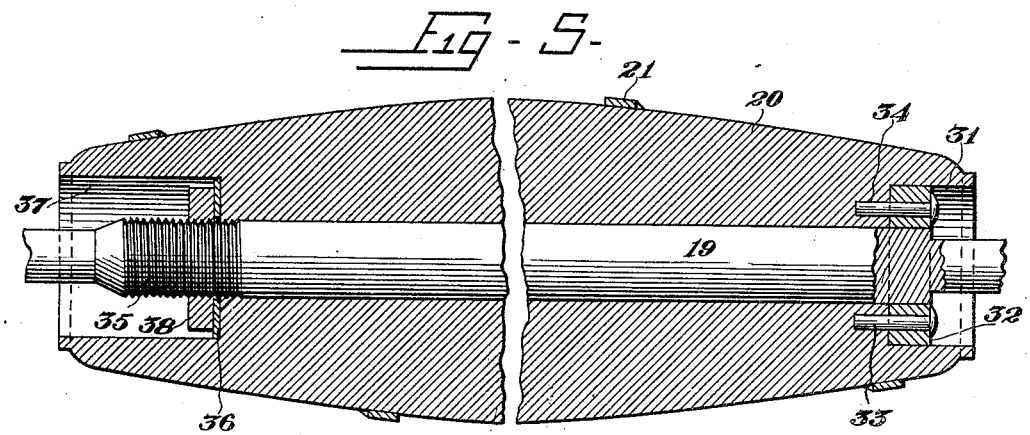
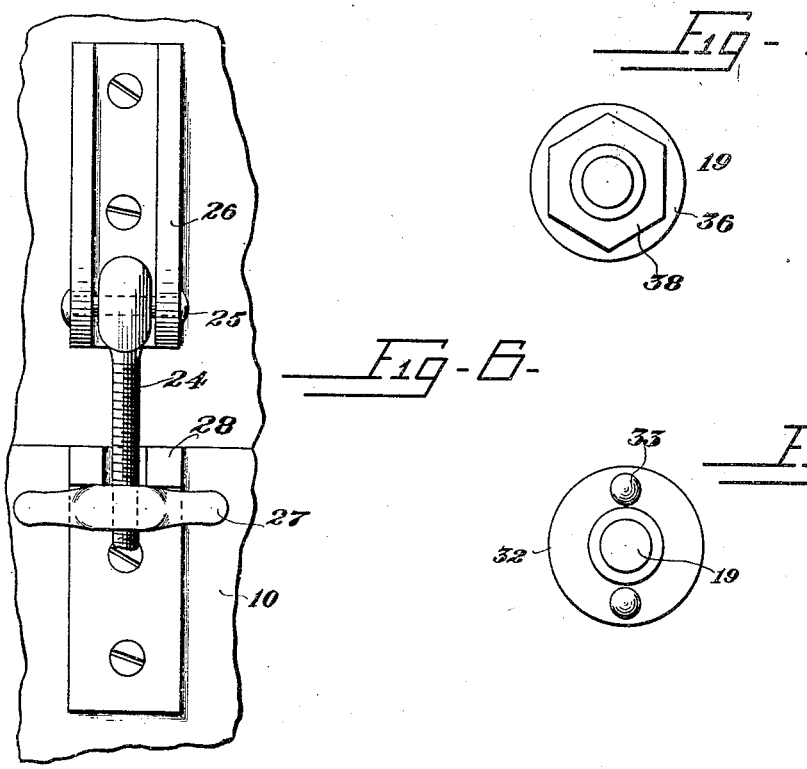
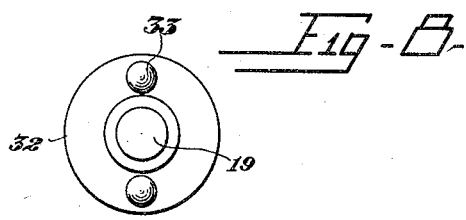
Ubaldo Forbidussi
INVENTOR
BY Victor J. Evans
ATTORNEY Patented May 10, 1932

1,858,147

UNITED STATES PATENT OFFICE

UBALDO FORBIDUSSI, OF DELCARBON, COLORADO

FRUIT CRUSHER

Application filed December 5, 1930. Serial No. 500,351.

This invention relates to machines for crushing fruit, an object being to provide a machine into which the fruit may be fed and crushed.

Another object of the invention is the provision of a crushing roller of novel construction which cooperates with a panel to feed the fruit longitudinally of the roller during the crushing operation, so that the fruit may be thoroughly crushed and the juice effectually removed with a minimum amount of power applied to the roller.

Another object of the invention is the provision of a machine which, in addition to the above and other advantageous features is simple in construction, easy to operate, and may readily taken apart for cleaning or repair and quickly reassembled, so that the machine may be kept in a sanitary condition.

With the above and other objects in view, the invention further includes the following novel features and details of construction, to be hereinafter more fully described, illustrated in the accompanying drawings and pointed out in the appended claims.

In the drawings:—

Figure 1 is a side elevation of a fruit crushing machine constructed in accordance with the invention.

Figure 2 is an end view.

Figure 3 is a longitudinal sectional view taken substantially on the line 3—3 of Figure 2.

Figure 4 is a section on the line 4—4 of Figure 1.

Figure 5 is an enlarged fragmentary sectional view taken longitudinally of the roller.

Figure 6 is an enlarged fragmentary elevation illustrating the manner of securing the hopper to the frame of the machine.

Figure 7 is a view looking at one end of the roller.

Figure 8 is a view looking at the opposite end.

Referring to the drawings in detail wherein like characters of reference denote corresponding parts, the reference character 10 indicates the frame of the machine which may be constructed of any suitable material, and which is supported upon legs 11 connected by upper and lower connecting bars 12 and 13 respectively.

The frame is provided with reversely inclined panels 14 and 15, the former being provided with oppositely inclined surfaces 16 upon its upper face. These panels 14 and 15 have their edges spaced so as to provide a discharge opening 17.

Mounted in bearings 18 secured to the frame 10 is a shaft 19 and mounted upon this shaft between the panels 14 and 15 is a crushing roller 20. This roller is oppositely tapered so as to conform to the inclined surfaces 16 of the panel 14, and the roller is slightly spaced from the panel as shown. The outer periphery of the roller is provided with spirally arranged ribs 21 which will cause the fruit fed to the panel 14 to move longitudinally of the roller and to be crushed during this movement between the roller and the panel 14. Crushing of the fruit therefrom will thus be effected with a minimum amount of power to the shaft. This power may be applied by any suitable or convenient means, such as by coupling the shaft of a motor to the shaft 19, the motor being indicated at 22.

Mounted upon the frame 10 is a hopper 23 and this hopper is removably secured to the frame through the medium of bolts 24 which are pivotally mounted as shown at 25 to brackets 26 secured to the hopper. These bolts have threadedly mounted thereon wing nuts 27 which are adapted to engage spaced lugs 28 carried by the frame 10 and between which the bolts 24 are positioned. The hopper may thus be readily removed when desired.

Located within the hopper is a feeding panel 29. This panel is inclined in conformity with the inclination of the panel 14 and forms a continuation of the latter when the hopper is mounted upon the frame. In addition the hopper carries a baffle plate 30. This plate is inclined reversely from the panel 29 and extends over beyond the axial center of the roller 20 so that fruit may be placed within the hopper and will gravitate upon the feeding panel 29 and directed to the roller 20. By extending the plate 30 in the manner shown, the fruit is prevented from flying upon the wrong side of the roller 20. In addition, this baffle plate 30 acts to prevent the fruit juices from being thrown upward above the top edge of the hopper.

The roller 20 is removably mounted upon its shaft 19 and for this purpose the roller is provided in one end with a socket 31. A collar 32 which is fast upon the shaft 19 is positioned within this socket and this collar carries pins 33 which are removably positioned within sockets 34 provided in the roller. The shaft 19 at the opposite end of the roller is provided with a threaded section 35 and mounted upon this section is a washer 36 which is positioned within a socket 37 provided in this end of the roller. A nut 38 is threaded upon the shaft 19 and acts to move this shaft longitudinally of the roller so as to hold the pins 33 within their sockets 34. The pins 33 prevent relative rotary movement between the shaft 19 and the roller 20, while the nut 38 prevents relative longitudinal movement.

Carried by the upper connecting bar 12 is a funnel-like member 39 whose walls are inclined. This funnel is positioned beneath the discharge opening 17 and acts to direct the fruit juices into a suitable container.

The invention is susceptible of various changes in its form, proportions and minor details of construction and the right is herein reserved to make such changes as properly fall within the scope of the appended claims.

Having described the invention what is claimed is:—

1. In a fruit crushing machine, a frame, reversely inclined panels carried by the frame and having edges spaced apart to define a discharge opening, a reversely tapered crushing roller mounted for rotation in the frame between the inclined panels, a reversely inclined surface for one of the panels, said surface being parallel with and slightly spaced from the periphery of the reversely tapered roller, a spiral rib extending around the roller, and means within the hopper to guide the fruit to one side of the axial center of the roller.

2. In a fruit crushing machine, a frame, reversely inclined panels carried by the frame and having edges spaced apart to define a discharge opening, a crushing roller mounted for rotation in the frame between the inclined panels, a shaft extending through said roller and mounted in bearings carried by the frame, a collar fast upon the shaft, pins extending from said collar into the roller to prevent relative rotary movement of the roller and shaft, a nut threadedly engaging the shaft and bearing against the roller to prevent relative longitudinal movement of said roller and shaft, a hopper mounted upon the frame above the roller, and means within the hopper to guide the fruit to one side of the axial center of the roller.

3. In a fruit crushing machine, a frame, reversely inclined panels carried by the frame and having edges spaced apart to define a discharge opening, a crushing roller oppositely tapered mounted for rotation in the frame between the inclined panels, the upper surface of one of said panels being oppositely inclined to conform to the inclination of the crushing roller, a hopper mounted on the frame above the roller, and means within the hopper to guide the fruit to one side of the axial center of the roller.

In testimony whereof I affix my signature.

UBALDO FORBIDUSSI.